United States Patent
Brandsma et al.

(10) Patent No.: US 10,687,655 B2
(45) Date of Patent: *Jun. 23, 2020

(54) BEVERAGE BREWING DEVICE FOR BREWING AND REMOVAL OF DIFFERENT SIZED BEVERAGE CAPSULES

(71) Applicants: David L Brandsma, St. Charles, MO (US); Joseph P Webster, St. Charles, MO (US)

(72) Inventors: David L Brandsma, St. Charles, MO (US); Joseph P Webster, St. Charles, MO (US)

(73) Assignee: Newco Enterprises, Inc., St. Charles, MO (US)

(*) Notice: Subject to any disclaimer, the term of this patent is extended or adjusted under 35 U.S.C. 154(b) by 864 days.

This patent is subject to a terminal disclaimer.

(21) Appl. No.: 14/998,711

(22) Filed: Feb. 4, 2016

(65) Prior Publication Data

US 2016/0157666 A1 Jun. 9, 2016

Related U.S. Application Data

(63) Continuation-in-part of application No. 14/544,650, filed on Jan. 29, 2015, now Pat. No. 9,788,682.

(60) Provisional application No. 62/176,976, filed on Mar. 3, 2015, provisional application No. 61/966,495, filed on Feb. 25, 2014.

(51) Int. Cl.
*A47J 31/40* (2006.01)
*A47J 31/36* (2006.01)

(52) U.S. Cl.
CPC ......... *A47J 31/407* (2013.01); *A47J 31/3638* (2013.01)

(58) Field of Classification Search
CPC .. A47J 31/407; A47J 31/3638; A47J 31/0673; A47J 31/4492; A47J 31/46; A47J 31/369; A47J 31/3633; A47J 31/3676; A47J 31/446; A47J 31/36; A23F 3/18; A23F 5/262; B65D 85/8043
See application file for complete search history.

(56) References Cited

U.S. PATENT DOCUMENTS

| | | |
|---|---|---|
| 5,325,765 A | 7/1994 | Sylvan et al. |
| 5,840,189 A | 11/1998 | Sylvan et al. |
| 6,079,315 A | 6/2000 | Beaulieu et al. |
| 6,182,554 B1 | 2/2001 | Beaulieu et al. |
| 6,606,938 B2 | 8/2003 | Taylor |
| 6,655,260 B2 | 12/2003 | Lazaris et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 7,165,488 B2 | 1/2007 | Bragg et al. |
| 7,210,401 B1 | 5/2007 | Rolfes et al. |
| 7,347,137 B2 | 3/2008 | Lafond et al. |

(Continued)

*Primary Examiner* — David J Walczak
(74) *Attorney, Agent, or Firm* — Paul M. Denk (57) ABSTRACT

A brewing system for brewing a single cup capsule beverage of different sizes is disclosed which comprises a funnel for receiving capsules of different sizes having an upper end for receiving the capsules therein, a lower end having a delivery spout, an upper needle, and a lower needle, a support collar adjacent the upper end of the funnel for receiving therein the capsules, and an eject mechanism connected to the support collar for pivoting the support collar away from the upper end of the funnel to eject the capsule out of the support collar.

3 Claims, 8 Drawing Sheets

(56) References Cited

U.S. PATENT DOCUMENTS

| | | | |
|---|---|---|---|
| 7,513,192 B2 | 4/2009 | Sullivan et al. | |
| 8,919,241 B2 * | 12/2014 | Hale | A47J 31/446 |
| | | | 99/275 |
| 9,700,171 B2 * | 7/2017 | Hanneson | A47J 31/46 |
| 2013/0340626 A1 | 12/2013 | Oh | |

* cited by examiner

BEVERAGE BREWING DEVICE FOR BREWING AND REMOVAL OF DIFFERENT SIZED BEVERAGE CAPSULES

CROSS REFERENCE TO RELATED APPLICATION

This continuation-in-part patent application claims priority to the provisional patent application having Ser. No. 62/176,976, filed on Mar. 3, 2015, and this continuation-in-part patent application claims priority to the non-provisional patent application having Ser. No. 14/544,650, filed on Jan. 29, 2014, now U.S. Pat. No. 9,788,682, which claims priority to the provisional patent application having Ser. No. 61/966,495, filed on Feb. 25, 2014.

FIELD OF THE DISCLOSURE

This disclosure relates to a device for brewing of a beverage, and more specifically relates to a beverage brewing device for brewing of different sized beverage capsules and for removal of the brewing capsule once a beverage has been brewed. More particularly, the present disclosure is directed to a device for brewing a single cup capsule beverage of different sizes, beverages such as coffee, tea, cocoa, or other hot beverage, through a vending machine, and the device is equipped to dispense and dispose of the different sized capsules once a brewing process or procedure has been completed.

BACKGROUND

One popular brewing system is a single serve system in which a capsule filed coffee, tea, or cocoa is inserted into the system to brew a single cup. The brewing system has a holder in which a bottom has a needle that is capable of puncturing a bottom of the capsule. A top cover is adapted to be lowered onto a top of the capsule. The top cover has a needle in an interior of the top cover with the needle capable of initially puncturing a top of the capsule. The needle in the top cover is also configured to deliver a liquid, such as hot water, through the needle in the top cover, into and through the capsule, out of the needle in the bottom of the holder, and out through a deliver spout provided on an exterior bottom of the holder. The system also has a water container connected to the needle in the top cover for providing of heated water to the capsule to brew the beverage. The delivery spout in bottom of the holder is used to funnel a brewed beverage out of the brewing system. Underneath the delivery spout is a cup that is placed there to capture the brewed beverage. In this manner, a single serving of a beverage is conveniently brewed. As can be appreciated, once a single serving of beverage is brewed, the used capsule is removed from the brewing system and another capsule is inserted therein for the next brewing operation to take place.

Some variations of the brewing system allow various sized beverages to be brewed. For example, if an individual wants to brew a ten ounce cup of coffee, then a button is selected to indicate that the brewing system should provide ten ounces of heated water through the capsule to brew only ten ounces of coffee. If an individual wants to brew twelve ounces of a beverage, another button on the brewing system is selected to have the brewing system only brew twelve ounces of the beverage. Although the quantity of beverage to be brewed is controllable, the quality of beverage to be brewed is not when using this brewing system.

In an effort to control the quality of a beverage to be brewed, there are some brewing systems that now incorporate the ability to accept different sized capsules to brew different strength beverages. For example, if a strong coffee is desired to be brewed, such brewing systems are adapted to accommodate a large capsule or a supercapsule. The large capsule is bigger than the typical single serve capsule and is able to contain a larger amount of coffee, tea, cocoa, or the like. In this manner, a stronger beverage may be brewed in the same sized cup. In order to accommodate these different sized capsules, the capsule holder or funnel is modified to allow the larger capsule to fit within the funnel. The capsule holder is further modified to include a pair of tiered piercing needles. An upper needle is positioned to pierce the bottom of a typical capsule and a lower needle is positioned to pierce the bottom of a large capsule. In this manner, two different sized capsules may be used in the same brewing device.

Although the brewing system that can handle different sized capsules is useful, there is no provision for automatically removing and disposing of either sized capsules once a brewing operation has been completed. As can be appreciated, if the brewing system is used in a commercial environment, it would be advantageous to quickly be able to automatically remove and dispose of a used capsule and to be able to insert a new capsule to immediately initiate another brewing operation. It would be beneficial if the used capsule, which may be wet, hot, and messy, would not have to be handled to remove the capsule from the brewing system.

The present disclosure is designed to obviate and overcome many of the disadvantages and shortcomings experienced with prior brewing systems. The present disclosure is related to a beverage brewing device for brewing of multiple size beverage capsules and for removal of the brewing capsule once a beverage has been brewed. The present disclosure is also directed to a device for brewing a single cup capsule beverage of different sizes through a vending machine and the device is equipped to dispense and dispose of the different sized capsules once a brewing operation has been completed.

SUMMARY OF THE DISCLOSURE

In one form of the present disclosure, a brewing system for brewing a single cup capsule beverage of different sizes through a vending machine is disclosed which comprises a funnel for receiving capsules of different sizes having an upper end for receiving the capsules therein, a lower end having a delivery spout, an upper needle, and a lower needle, a support collar adjacent the upper end of the funnel for receiving therein the capsules, and an eject mechanism connected to the support collar for pivoting the support collar away from the upper end of the funnel to eject the capsule out of the support collar.

In another form of the present disclosure, a brewing system for brewing a single cup capsule of beverage of different sizes is disclosed which comprises a funnel for receiving a capsule, the funnel having an upper end for receiving the capsule therein, a lower end having a delivery spout, an upper needle, and a lower needle, a support collar adjacent the upper end of the funnel for receiving therein the capsule, an upper aim assembly having an upper capsule needle, a lift arm having a slide boss, and an eject mechanism for engaging the slide boss and connected to the support collar for pivoting the support collar away from the upper end of the funnel to eject the capsule out of the support collar.

In yet another form of the present disclosure, a brewing system for brewing a single cup capsule beverage of different sizes is disclosed which comprises a funnel for receiving a capsule, the funnel having an upper end for receiving the capsule therein, a lower end having a delivery spout, an upper needle, and a lower needle, a support collar adjacent the upper end of the funnel for receiving therein the capsule, a return spring connected to the support collar for returning the support collar to an initial position, an upper arm assembly having an upper capsule needle and a conduit for delivering water there through to the upper capsule needle, a lift arm having a slide boss, and an eject mechanism for engaging the slide boss and connected to the support collar for pivoting the support collar away from the upper end of the funnel to eject the capsule out of the support collar.

In light of the foregoing comments, it will be recognized that the present disclosure provides a device for brewing a single cup capsule beverage of different sizes through a vending machine and the device is equipped to dispense and dispose of the different sized capsules once a brewing operation has been completed.

The present disclosure provides a device for brewing a beverage that can automatically dispose of a capsule after a brewing operation has been completed to allow a different capsule to be placed in the device for the next brewing operation.

The present disclosure is also directed to a device for brewing a beverage that accepts different sized capsules and disposes of the different sized capsules once a brewing operation has been completed.

The present disclosure provides a device for brewing a beverage that automatically resets itself to receive different sized capsules once a used capsule has been disposed of by the device.

The present disclosure provides a device for brewing a single cup capsule beverage of different sizes through a vending machine that is simple and easy to use.

The present disclosure is also directed to a device for brewing a single cup capsule of different sizes that does not require that a used capsule be handled once a brewing operation is completed.

These and other advantages of the present disclosure will become more apparent to those skilled in the art after considering the following detailed specification in conjunction with the accompanying drawings.

DETAILED DESCRIPTION OF PREFERRED EMBODIMENTS

Figure 1:
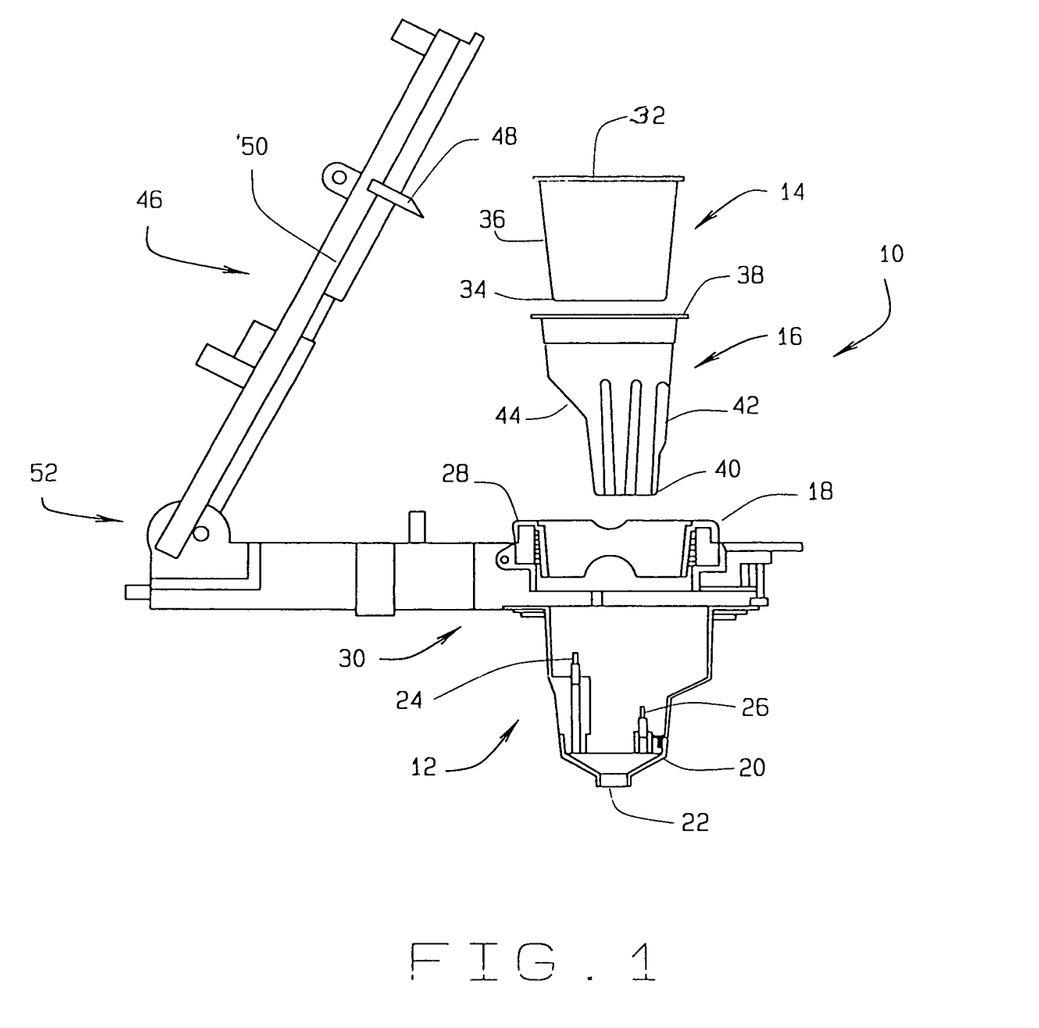
FIG. 1 is a side cross-sectional view of a device for brewing and removal of different sized capsules constructed according to the present disclosure.

Referring now to the drawings, wherein like numbers refer to like items, number 10 identifies a preferred embodiment of a device for brewing and removal of different sized capsules constructed according to the present disclosure. With reference now to FIG. 1, the device 10 is shown comprising a funnel-like member 12 for receiving capsules 14 and 16 of different sizes. For example, the capsule 14 is a regular size capsule and the capsule 16 is a large size capsule. The device 10 has an upper end 18 for receiving one of the capsules 14 and 16 therein, a lower end 20 having a delivery spout 22, an upper venting probe or needle 24, for piercing a capsule of one size, and a lower venting probe or needle 26 for piercing the bottom of a capsule of another size. As stated, the needle 24 is used to pierce the capsule 14 and the lower needle 26 is used to pierce the bottom of the capsule 16. A support collar 28 is provided adjacent to the upper end 18 of the funnel 12 for receiving therein either of the capsules 14 or 16. An eject mechanism 30 is connected to the support collar 28 for pivoting the support collar away from the upper end 18 of the funnel 12 to eject one of the capsules 14 or 16 out of the support collar 28 for disposal.

The funnel 12 is sized and shaped to receive either of the capsules 14 or 16. The capsule 14 has an upper end 32, a lower end 34, and a central body 36. A quantity of a substance (not shown), such as coffee, tea, cocoa, or other beverage to be brewed, is packaged in the central body 36. The upper needle 24 is positioned so that the lower end 34 of the capsule 14 will be pierced by the needle 24. The capsule 16 has an upper end 38, a lower end 40, and a body 42 having a ledge 44. Again, a quantity of a substance (not shown) is packaged within the body 42. As can be appreciated, since the capsule 16 is larger than the capsule 14, a larger quantity of a substance is packaged within the capsule 16 as opposed to the capsule 14. The lower needle 26 is positioned within the funnel 12 so that the lower end 40 of the capsule 16 will be pierced by the lower needle 26. Also, the ledge 44 is positioned so that the needle 24 does not contact or pierce any portion of the capsule 16.

The device 10 also has an upper arm assembly 46 having an upper capsule needle 48 connected to a conduit or tubing 50. Although not shown, the upper arm assembly 46 may also include a flexible probe seal. The conduit 50 is used to supply a quantity of water (not shown) through the upper capsule needle 48 into either of the capsules 14 or 16. Although not shown, the device 10 is capable of providing heated water through the arm conduit 46, the needle 48, and into either of the capsules 14 or 16 for brewing a substance packaged in the capsules 14 or 16. The upper arm assembly 46 can pivot about a pivot mechanism 52. For example, the upper arm assembly 46 may be pivoted downwardly for the upper capsule needle to pierce either the upper end 32 of the capsule 14 or the upper end 38 of the capsule 16. The upper needle pierces before the lower needles 24 and 26. When a brewing operation has been completed, the upper arm assembly 46 may be pivoted upwardly to remove the upper capsule needle 48 from either the end 32 or the end 38. The upper ends 32 and 38 are of the same size and the upper capsule needle 48 pierces the upper ends 32 and 38 at the same point. This is explained in Ser. No. 61/966,495. As can be appreciated, there are other elements or components of the device 10 which are not shown. By way of example only, the device 10 may include a pressurized hot water source or supply, switches or buttons to actuate or control operation of the device 10, a display for visually indicating messages concerning control of the device 10, a control unit, and electrical components, wires, or cords.

Figure 2:
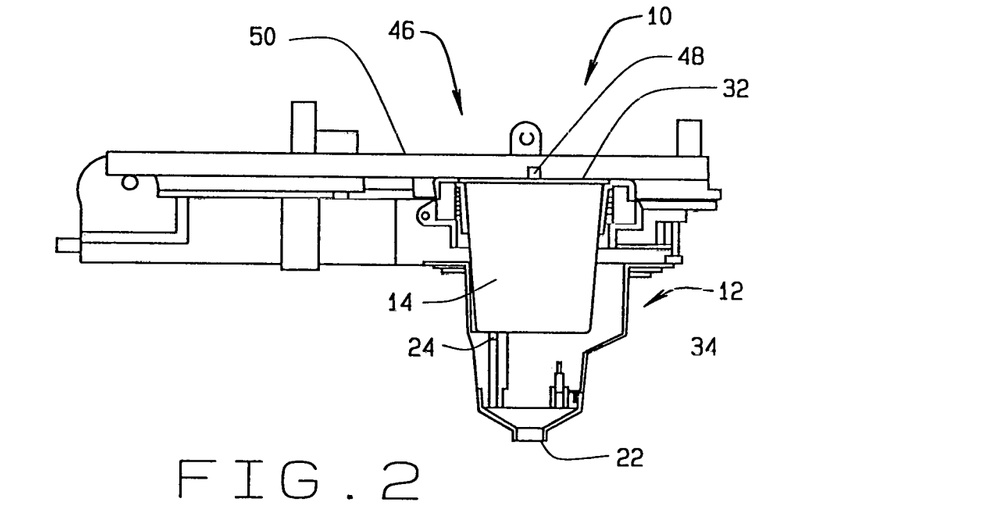
FIG. 2 is a side cross-sectional view of the device shown in FIG. 1, with a standard size capsule inserted into the device and an upper arm assembly in a closed position.

FIG. 2 shows the device 10 having the capsule 14 placed therein and the upper arm assembly 46 moved to a closed position. In the closed position, the device 10 is capable of heating water to brew a beverage. The capsule 14 has the bottom end 34 pierced by the upper needle 24 and the upper capsule needle 48 initially pierces the upper end 32. In this manner, heated water may flow through the conduit 50, the needle 48, the capsule 14, the needle 24, and out through the delivery spout 22. A brewed beverage flows out of the delivery spout 22 and is deposited into a cup (not shown) placed below the spout 22.

Figure 3:
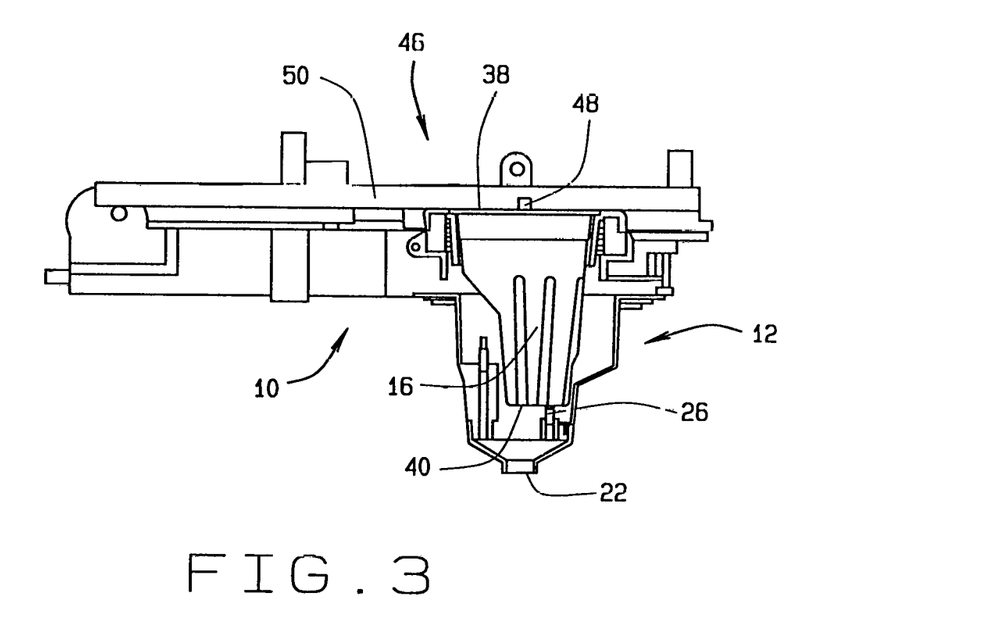
FIG. 3 is a side cross-sectional view of the device shown in FIG. 1, with a large size capsule inserted into the device and an upper arm assembly in a closed position.

Referring now to FIG. 3, the device 10 is illustrated having the upper arm assembly 46 placed into a closed position with the capsule 16 placed in the funnel 12. With the upper arm assembly 46 in the closed position, the upper capsule needle 48 initially pierces the upper end 38 of the capsule 16. Also, the lower end 40 of the capsule 16 is then pierced by the lower needle 26. Heated water now has a flow path through the needle 48, the capsule 16, and out the lower needle 26 to brew a beverage. As indicated above, a brewed beverage flows out of the delivery spout 22 to be captured in a cup placed below the spout 22.

Figure 4:
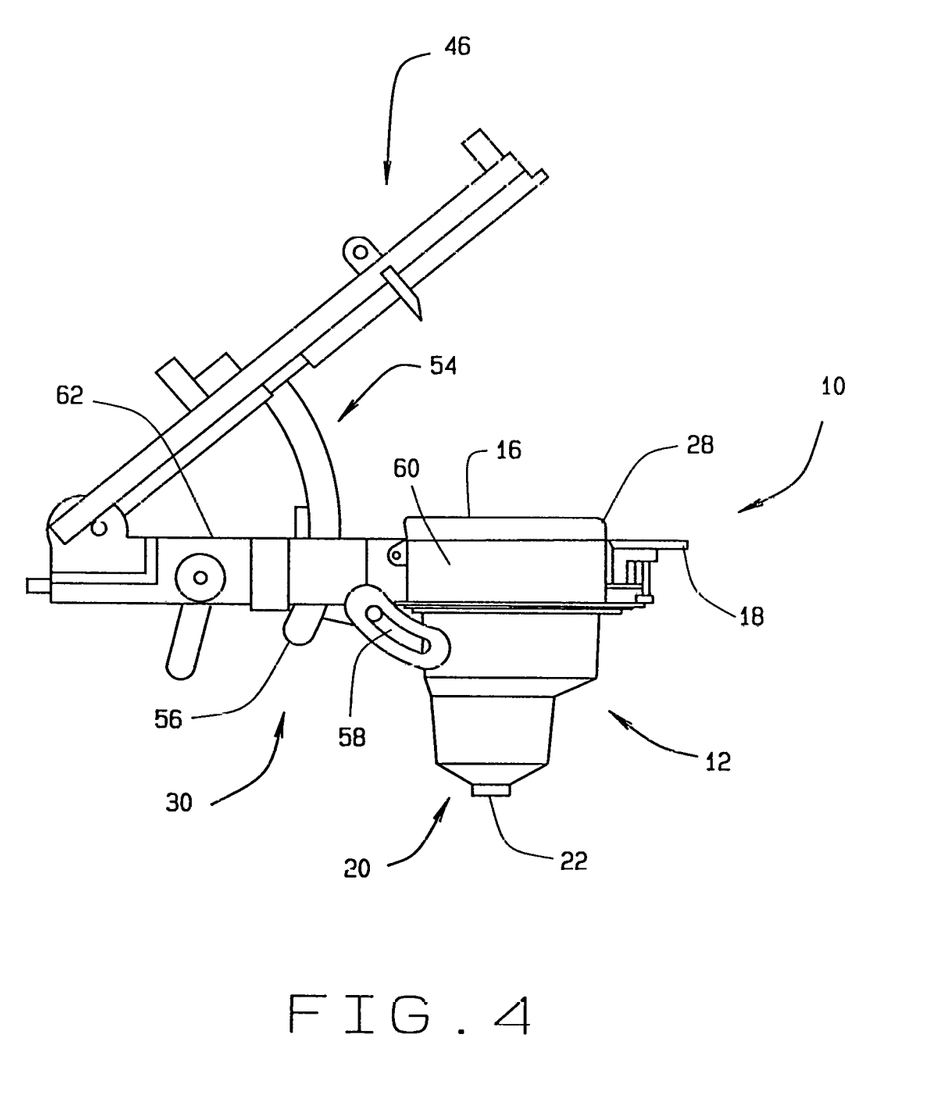
FIG. 4 is a side view of the device shown in FIG. 1, with a large size capsule inserted into the device and an upper arm assembly being moved into an open position.

FIG. 4 depicts the device 10 after a brewing operation has been completed with the upper arm assembly 46 beginning to be moved into an open position. When the upper arm assembly 46 is opened in this manner, the device 10 will be able to eject the used capsule 16 which is in the funnel 12 through operation of the eject mechanism 30. The device 10 is shown having the funnel 12 for receiving the capsule 16, the support collar 28 for receiving the capsule 16 therein, and the lower end 20 having the delivery spout 22. The device 10 also comprises a lift arm 54 having a slide boss 56 which is positioned adjacent to a linkage 58. A return spring 60 is connected to the support collar 28 and a horizontal support member or base 62. The return spring 60 will return the support collar 28 to a horizontal position adjacent the upper end 18, as will be described in more detail herein. The lift arm 54, the slide boss 56, the linkage 58, the return spring 60, and the member 62 form the eject mechanism 30.

Figure 5:
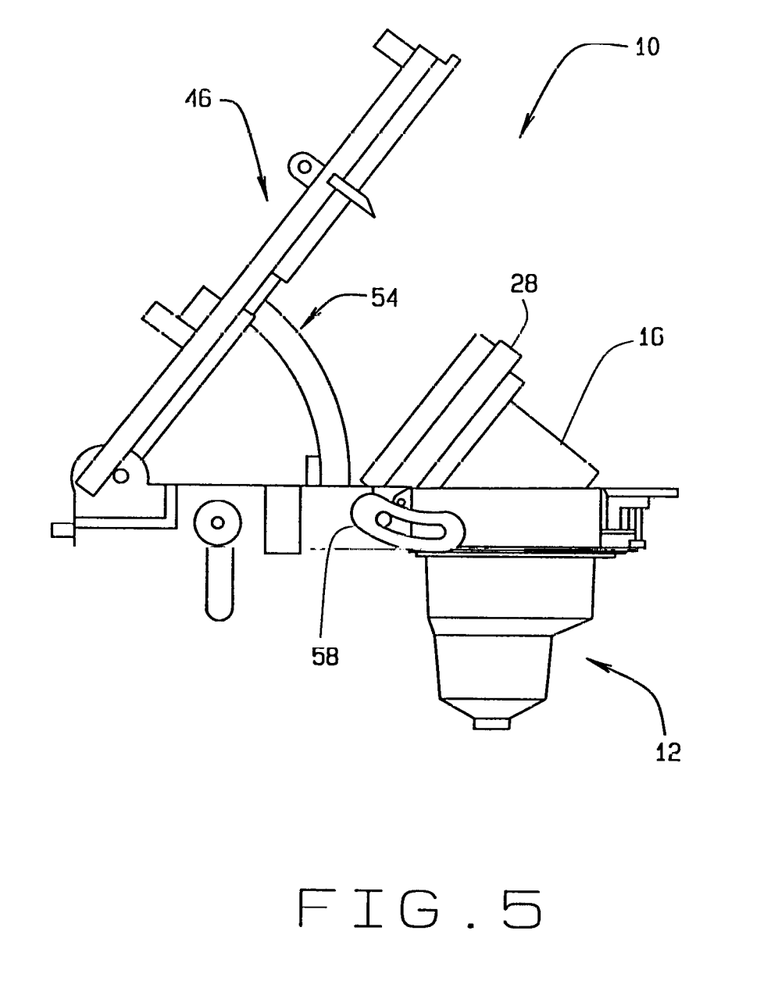
FIG. 5 is a side view of the device shown in FIG. 1, with a large size capsule inserted into the device, an upper arm assembly being moved into an open position, and the large size capsule beginning to be ejected from the device.

With reference now to FIG. 5, the upper arm assembly 46 has continued to be moved to the open position to begin to move the support collar 28 to eject the capsule 16. The slide boss 56 engages the linkage 58 to pivot the support collar 28. This also releases the capsule 16 from the lower needle 26 to remove the capsule 16 from the funnel 12.

Figure 6:
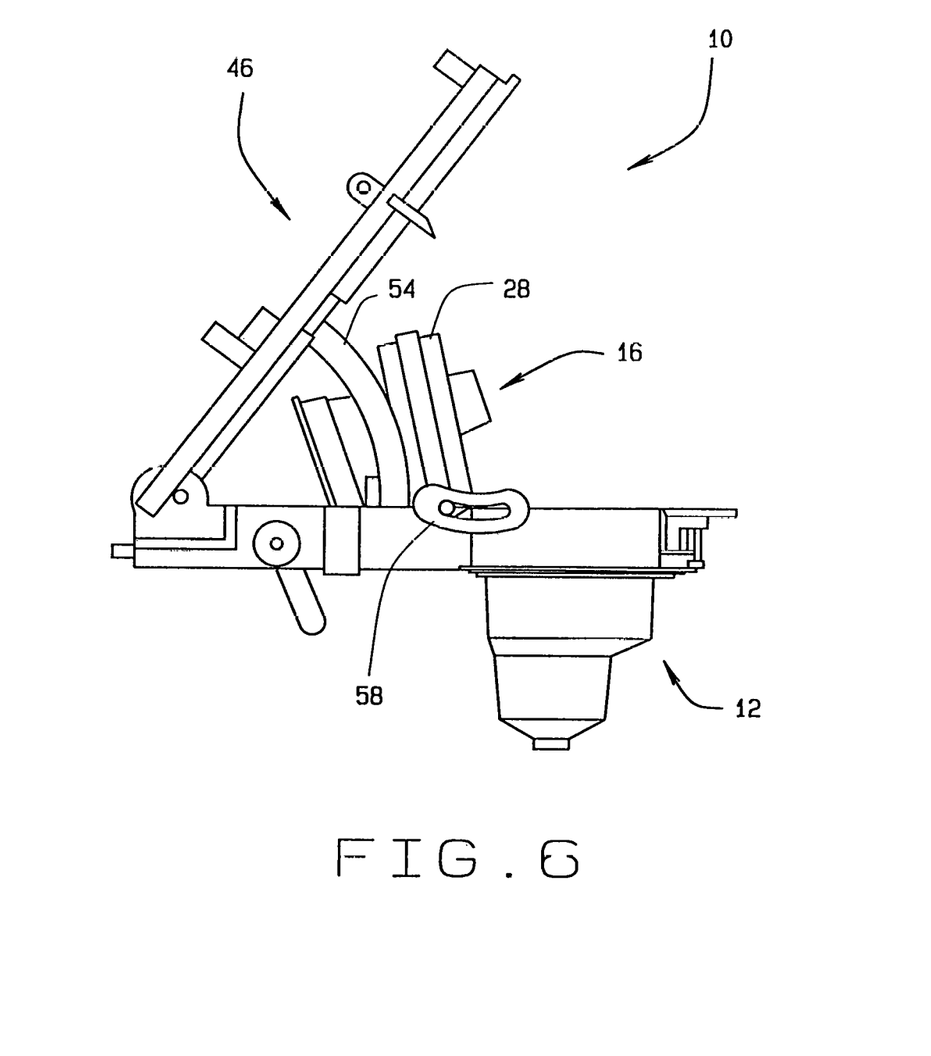
FIG. 6 is a side view of the device shown in FIG. 1, with a large size capsule inserted into the device, an upper arm assembly being moved in an open position, and the large size capsule being ejected from the device.

FIG. 6 illustrates the continued movement of the upper arm assembly 46 to move the support collar 28 over vertical to release the capsule 16 from the support collar 28. At this point, the lift arm 54 disengages the linkage 58.

Figure 7:
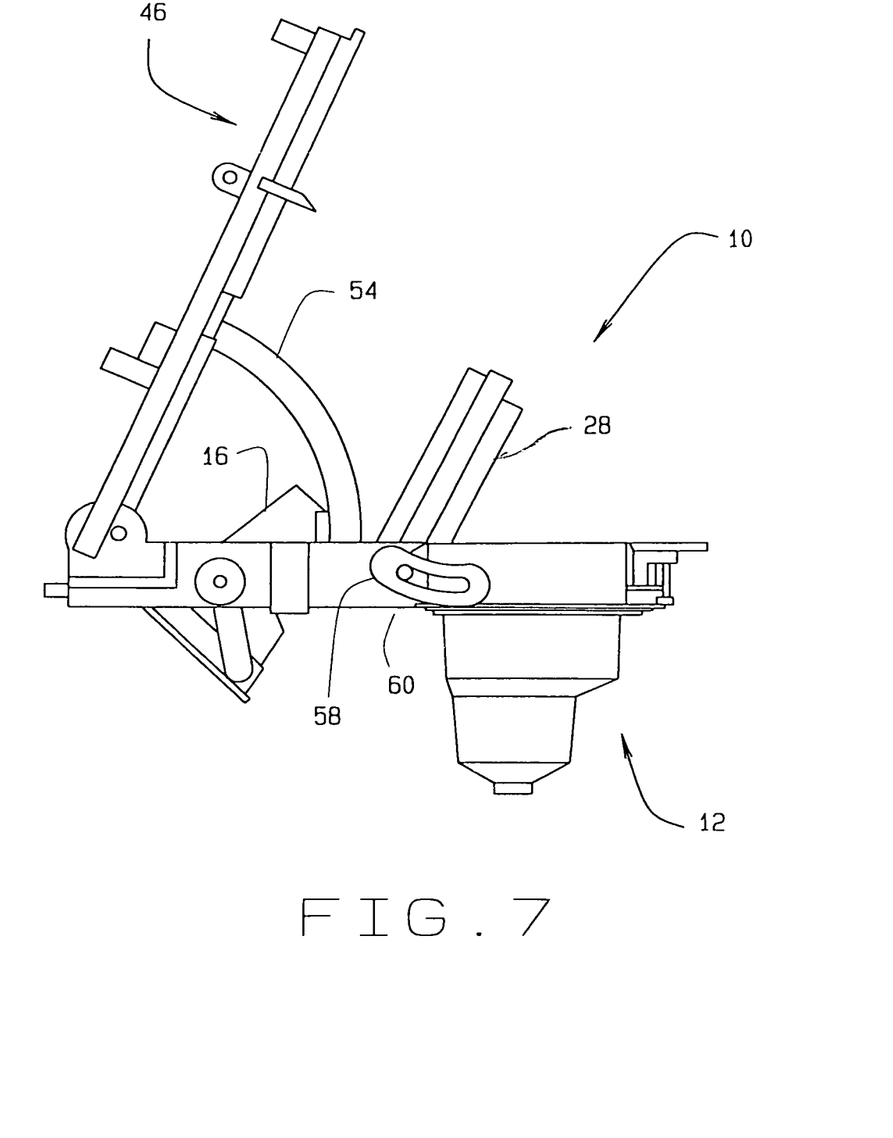
FIG. 7 is a side view of the device shown in FIG. 1, with a large size capsule inserted into the device, an upper arm assembly being moved into an open position, and the large size capsule being ejected from the device.

Referring now to FIG. 7, the capsule 16 has fallen out of the support collar 28 to begin falling into a waste bin (not shown). After the lift arm 54 has been released from the linkage 58, the return spring 60 returns the support collar 28 to a horizontal position above the upper end 18 of the funnel 12.

Figure 8:
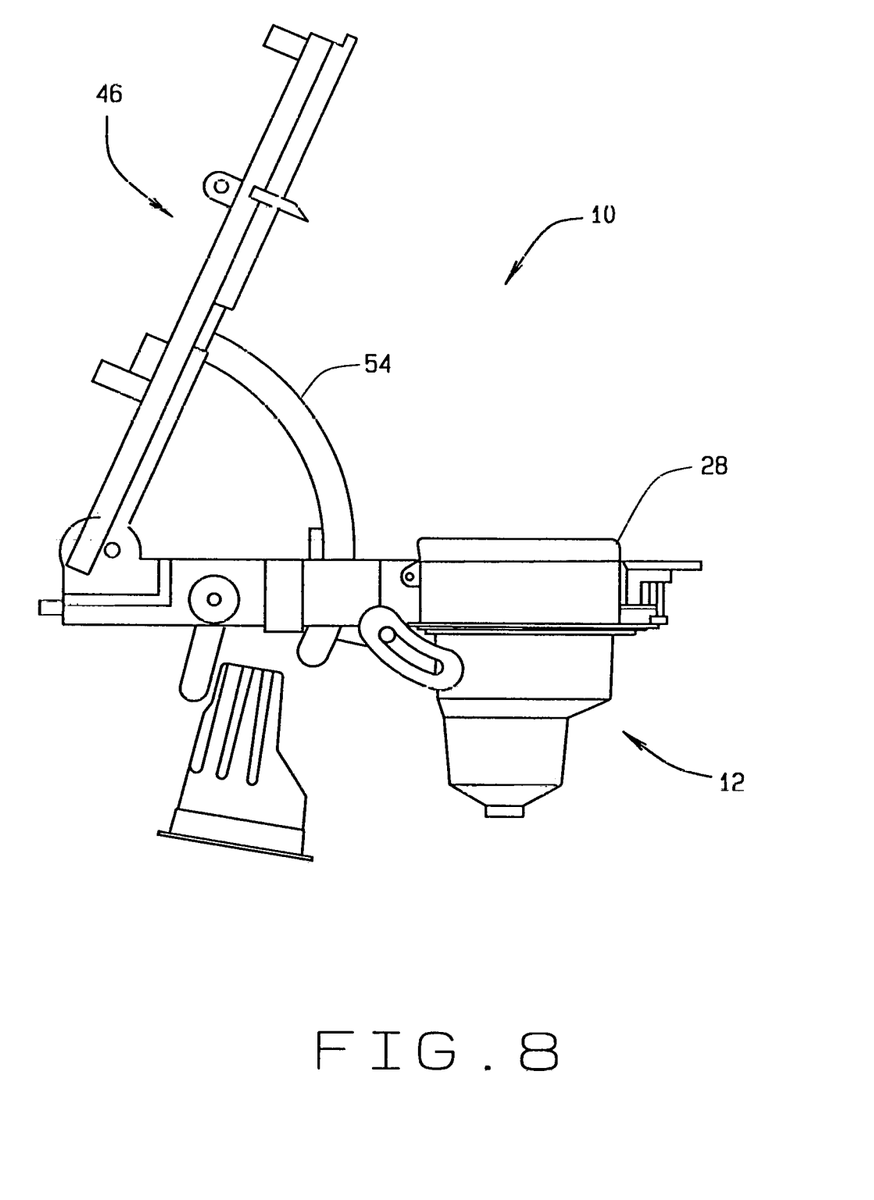
FIG. 8 is side view of the device shown in FIG. 1, with a large size capsule being fully ejected from the device and a support collar being returned to an initial position.

In FIG. 8, the capsule 16 is shown descending downwardly to be disposed of or discarded into a waste bin (not shown). The support collar 28 is empty and ready for another capsule 14 or 16 to be placed therein and another brewing cycle to commence.

The device 10 operates in the following manner to brew different or multiple sized capsules, such as the capsules 14 or 16, in the single funnel 12 that is shaped to receive either of the capsules 14 or 16. The following example assumes that the large capsule 16 has been selected for brewing. The capsule 16 is placed into the funnel 12 and supported by the support collar 28. The capsule 16 is initially suspended above the lower needle 26. The brewing process begins when an individual closes the upper arm assembly 46 of the device 10 and the upper capsule needle 48 pierces the upper end 38 of the capsule 16. The tubing 50 is connected to a pressurized hot water source that sends hot water into the capsule 16 when a brew cycle is initiated. Since the capsule 16 is supported by the collar 28, the needle 48 pierces the upper end 38 and a probe seal drives the capsule 16 down defeating the spring tension of the collar 28. This also forces the lower end 40 of the capsule 16 to be pierced by the lower needle 26. A path is now complete for water to flow through the tubing 50, the needle 48, the capsule 16, the lower needle 26, and out the spout 22 into a cup placed below the spout 22.

Once the brewing process has been completed, the used or spent capsule 16 will remain in the funnel 12 in the device 10. An individual may remove and dispose of the capsule 16 by opening the device 10 by operation of the upper arm assembly 46. Movement of the upper arm assembly 46 causes the spring loaded support collar 28 to move the capsule up off of the lower needle 26. As the upper arm assembly 46 is moved further, the lift arm 54 causes the eject mechanism 30 to pivot the collar 28 past vertical to allow the capsule 16 to fall out of the collar 28 to be captured within a waste bin. The lift arm 54 reaches the end of the travel of the linkage 58 and slides off of the linkage 58 which causes the support collar 28 to return to a horizontal or initial position by use of the return spring 60. Once the collar 28 is returned to the initial position, a new capsule 14 or 16 may be placed in the collar 28 to being a new brew cycle. In this manner, the capsules 14 or 16 are automatically ejected and disposed of from the device 10 without having to personally handle a spent or used capsule 14 or 16.

Figure 9:
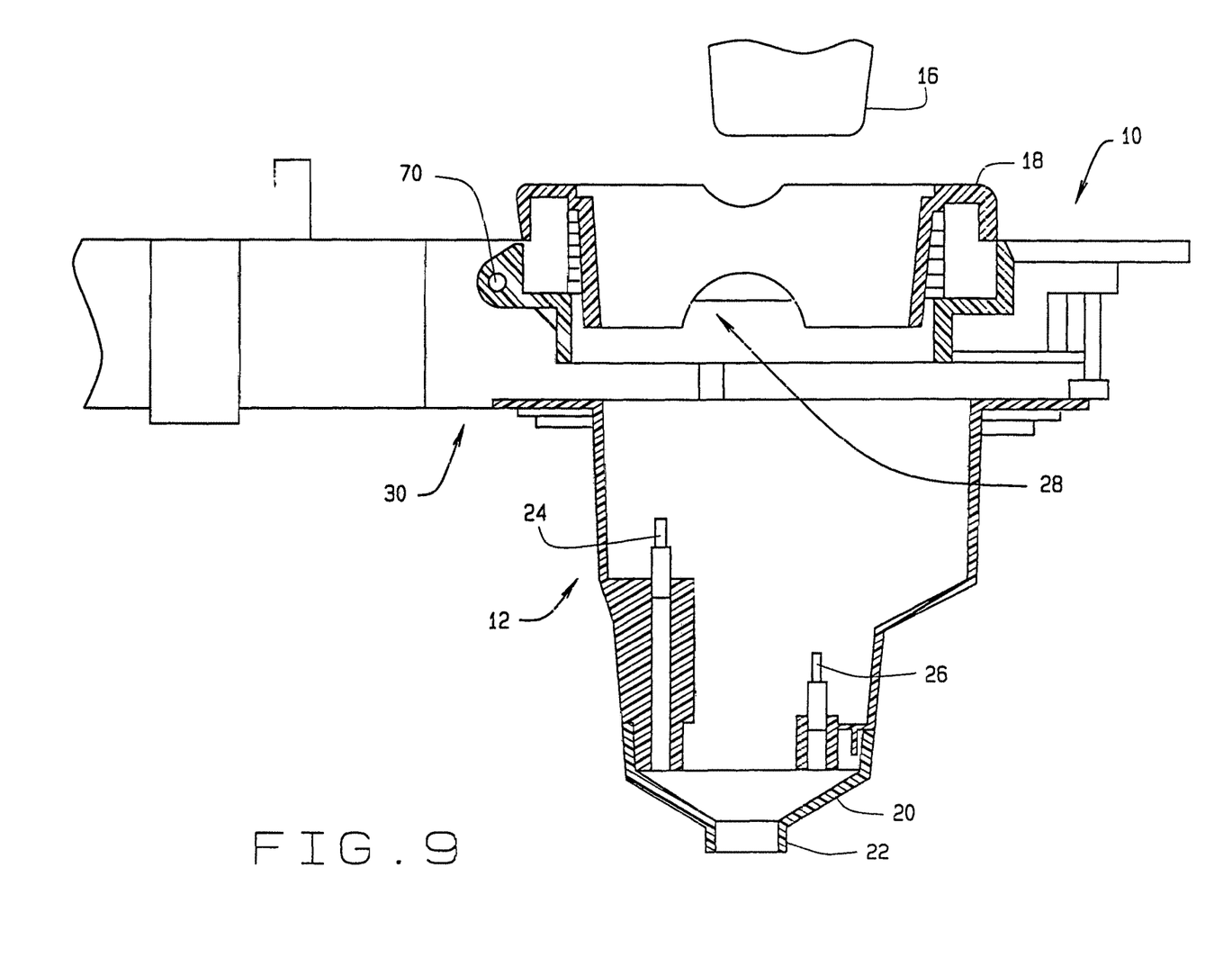
FIG. 9 is an enlarged partial side cross-sectional view of the device shown in FIG. 1.

FIG. 9 illustrates an enlarged partial side cross-sectional view of the device 10. The device 10 is shown comprising the funnel-like member 12 for receiving the capsule 16. In this particular view, the capsule 16, which is the large size capsule, is shown about to be inserted into the funnel 12. Although, as has been discussed herein, the device 10 is also capable of receiving the capsule 14. The device 10 has the upper end 18, the lower end 20 having the delivery spout 22, the upper venting probe or needle 24 and the lower venting probe or needle 26. The support collar 28 is provided adjacent to the upper end 18 of the funnel 12 for receiving therein either of the capsules 14 or 16. The eject mechanism 30 is connected to the support collar 28 for pivoting the support collar 28 about a pivot axle 70 away from the upper end 18 of the funnel 12 to eject one of the capsules 14 or 16 out of the support collar 20 for disposal. Although not shown, it is possible that a lower funnel tube is connected to the delivery spout 22 to assist in directing beverage from within the funnel 12. It is further contemplated, even though not shown here, to have a conduit connected to the lower funnel tube to further direct beverage from the lower funnel tube through the conduit downwardly into a cup or other receiving receptacle that may have been previously located within for example a vending machine.

From all that has been said, it will be clear that there has thus been shown and described herein a device for brewing a single cup capsule beverage of different sizes through a vending machine. It will become apparent to those skilled in the art, however, that many changes, modifications, variations, and other uses and applications of the subject device for brewing are possible and contemplated. All changes, modifications, variations, and other uses and applications which do not depart from the spirit and scope of the disclosure are deemed to be covered by the disclosure, which is limited only by the claims which follow.

What is claimed is:

1. A device for brewing a single cup capsule beverage of different sizes comprising:

a funnel for receiving capsules of different sizes having an upper end for receiving the capsules therein, a lower end having a delivery spout, an upper needle, and a lower needle;

a support collar adjacent the upper end of the funnel for receiving therein the capsules; and    an eject mechanism connected to the support collar for pivoting the support collar away from the upper end of the funnel to eject the capsule out of the support collar.

2. The device for brewing a single cup capsule beverage of different sizes of claim 1 wherein the funnel is sized and shaped to receive a first capsule having an upper end, a lower end, and a body with the lower end for being pierced by the upper needle of the funnel and a second capsule having an upper end, a lower end, and a body having a ledge with the lower end for being pierced by the lower needle of the funnel.

3. The device for brewing a single cup capsule beverage of different sizes of claim 1 further comprising a horizontal base member for supporting the funnel.

* * * * *